United States Patent
Arora et al.

(10) Patent No.: US 6,625,693 B2
(45) Date of Patent: *Sep. 23, 2003

(54) FAST EXCEPTION PROCESSING

(75) Inventors: Ken Arora, Cupertino, CA (US); Harshvardhan Sharangpani, Santa Clara, CA (US); Gary Hammond, Fort Collins, CO (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,372

(22) Filed: May 4, 1999

(65) Prior Publication Data
US 2002/0052992 A1 May 2, 2002

(51) Int. Cl.[7] ................................ G06F 12/00
(52) U.S. Cl. .................. 711/125; 711/140; 712/244
(58) Field of Search ................. 711/118, 125, 711/140, 169; 709/318; 712/219, 243, 244

(56) References Cited

U.S. PATENT DOCUMENTS

| | | | | |
|---|---|---|---|---|
| 5,305,455 A | * | 4/1994 | Anschuetz et al. | 709/100 |
| 5,634,108 A | * | 5/1997 | Freeman | 711/118 |
| 5,909,574 A | * | 6/1999 | Meyer | 712/244 |
| 5,966,529 A | * | 10/1999 | Sollars | 712/228 |
| 6,003,129 A | * | 12/1999 | Song et al. | 712/244 |
| 6,012,125 A | * | 1/2000 | Tran | 711/125 |
| 6,038,645 A | * | 3/2000 | Nanda et al. | 711/141 |
| 6,141,740 A | * | 10/2000 | Mahalingaiah et al. | 711/215 |
| 6,157,988 A | * | 12/2000 | Dowling | 711/140 |
| 6,170,051 B1 | * | 1/2001 | Dowling | 712/225 |
| 6,295,580 B1 | * | 9/2001 | Sturges et al. | 711/129 |

* cited by examiner

Primary Examiner—Gary Portka
(74) Attorney, Agent, or Firm—Schwegman, Lundberg, Woessner & Kluth, P.A.

(57) ABSTRACT

Fast exception processing is disclosed. In one embodiment, a system includes a splice cache, an exception logic, and an instrumentation mechanism. The splice cache contains one or more lightweight handlers. The exception logic is coupled to the splice cache and determines whether the corresponding lightweight handler for an exception is located in the splice cache. The instrumentation mechanism is coupled to the splice cache. The instrumentation mechanism inserts the lightweight handler into an execution stream.

33 Claims, 3 Drawing Sheets

FAST EXCEPTION PROCESSING

FIELD

This invention relates generally to exception processing, and more particularly to fast exception processing in the context of pipelined processors.

BACKGROUND

The speeds at which processors perform are increasing due to constantly increasing computing needs. There are a number of ways to increase the speed of the processor, such as decreasing cycle time and reducing the average number of cycles required to execute many instructions collectively.

A well known way of increasing performance in processors and microcontrollers is to overlap the steps of different instructions using a technique called pipelining. To pipeline instructions, the various steps of instruction execution are performed by independent units called pipeline stages. As the number of stages is increased, while keeping the work done by any given instruction constant, the processor is said to be more heavily pipelined. Each instruction progresses from stage to stage, ideally with another instruction progressing in lock step only one stage behind. Thus, there can be as many instructions in execution, as there are pipeline stages. Each stage of execution is designed to perform its work within the processor's basic machine cycle. Thus, although each instruction requires as many cycles to perform as there are pipeline stages, a pipelined processors throughput is one instruction per cycle. In this manner, pipelining reduces the average number of cycles required to execute many instructions collectively, though it does not reduce the total amount of time required to execute any single instruction, by permitting the processor to handle more than one instruction at a time. Thus, pipelining is an architectural technique for improving performance over what can be achieved via processor circuit design improvements alone.

When a processor is executing, exceptions may occur. An exception is a special condition or event that unpredictably changes the normal flow of control in a program. The software that handles an exception is typically called an exception handler or handler. Generally, exceptions are either fatal or non fatal. A fatal exception is an exception which results in abrupt termination of execution. A non fatal exception does not result in abrupt termination of execution.

When a non-fatal exception occurs, typically the operating system (OS) must be called and the pipeline is flushed. This causes a severe degradation of performance depending on the type of application the processor is engaged in. If the non-fatal exception is occurring frequently, severe degradation of performance occurs.

One solution has been to hardwire exception processing. This can result in the instruction pointer not changing and as a result no flushing of the pipeline occurs. An example of this solution is Intel Corporation's 32-bit form iA32 of the industry standard architecture (ISA). When a translation look aside buffer (TLB) miss occurs, the ISA actually handles the translation cache miss in hardware, by performing "page table walk" in microcode, as it attempts to find the missing translation. A TLB is a table used in a virtual memory system, which lists the physical address page number associated with each virtual address page number. A TLB is used in conjunction with a cache whose tags are based on virtual addresses. The virtual address is presented simultaneously to the TLB and to the cache so that cache access and virtual to physical address translation can proceed in parallel (the translation is done "on the side"). If the requested address is not cached then the physical address is used to locate the data in main memory. The alternative would be to place the translation table between the cache and main memory so that it will only be activated once there was a cache miss. Since the code to handle the TLB miss event is "hardwired", no instruction fetch is needed to retrieve the instructions needed for the handler. As a result, no pipeline flush is needed since there is no change in the instruction pointer as a result of the TLB miss event. This approach eliminates the performance degradation caused by the pipeline being flushed. This works but has some drawbacks. One drawback to hardwired control is that only a limited number of exceptions may be hardwired. This approach is not entirely satisfactory because processors generally do not perform the same function all the time. For example, having the TLB miss hardwired does not benefit some applications such as one where only numerical calculations are involved. Another drawback to hardwired control is that hardwired control is fixed and therefore inflexible.

Other architectures such as the reduced instruction computing (RISC) architectures call the operating system more often in the event of an exception. This allows software to determine how to handle the exception but at the cost of performance. The present invention handles exceptions in a faster and more flexible manner.

DETAILED DESCRIPTION

In the following detailed description of exemplary embodiments of the invention, reference is made to the accompanying drawings which form a part hereof, and in which are shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
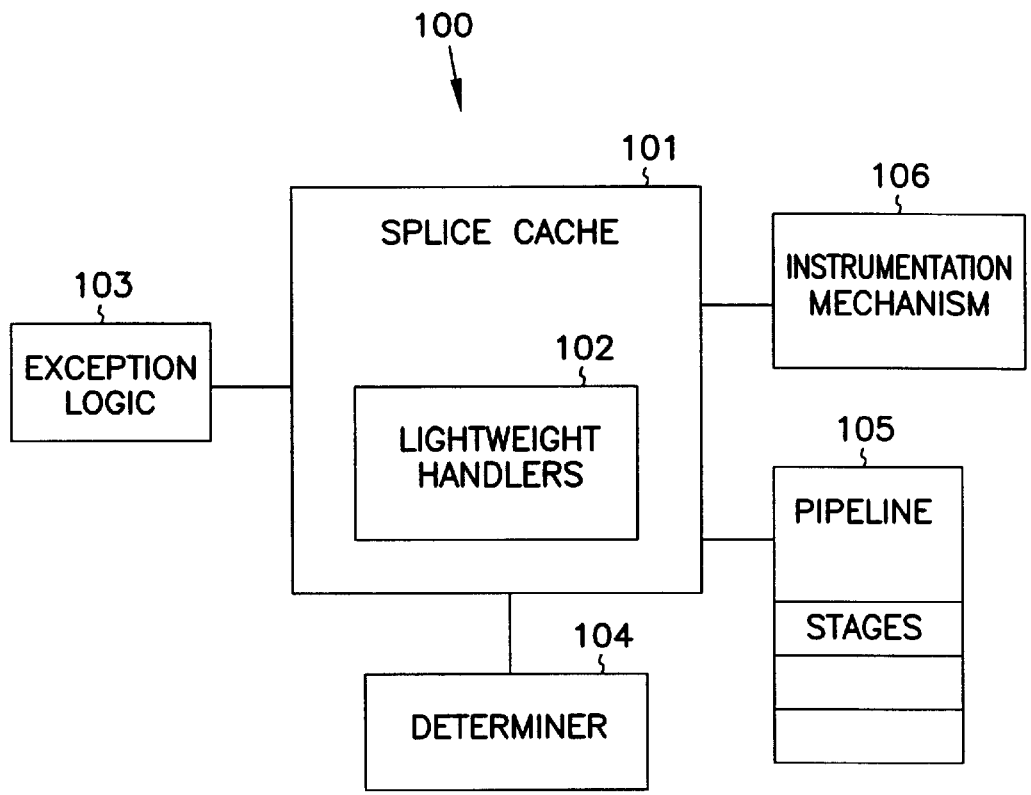
FIG. 1 shows a diagram of a system according to an embodiment of the invention.

Referring to FIG. 1, a system according to an embodiment of the invention is shown. The system includes a splice cache 101, one or more lightweight handlers 102, an exception logic 103, and an instrumentation mechanism. The splice cache 101 exists as a block of memory containing the plurality of lightweight handlers 102. The splice cache 101 may be of any size. Each lightweight handler is microcode for handling an exception. The exception is any unpredictable event.

The exception logic 103 is coupled to the splice cache. The exception logic 103 determines whether an exception has a corresponding lightweight handler in the splice cache 101. The lightweight handlers are exception handlers. The exceptions that are covered may be fatal or non-fatal. In one implementation, only non-fatal exceptions will be handled by the lightweight handler. In other implementations, any exceptions can be handled by the lightweight handler. If the exception is fatal, execution of that program stops. If the exception is one covered by a lightweight handler, then the appropriate lightweight handler in the splice cache handles the exception. Generally, this results in avoiding a full pipeline flush.

When a lightweight handler from the splice cache 101 handles an exception, the pipeline 105 is able to continue normal operation without flushing the pipeline. In one implementation, the pipeline is stalled and the lightweight handler inserted into the pipeline. The stall is much less performance costly than fully flushing the pipeline. For a frequently occurring exception, this can increase performance significantly.

The instrumentation mechanism 106 inserts the lightweight handler into an execution stream. The execution stream may be a pipeline or execution stream pipeline.

One way the lightweight handler may be inserted is to stall the processor and insert the instructions for the lightweight handler into the pipeline. Selection logic such as a multiplexor can be used to select what is coming down from a previous stage or the splice cache. This may be the implementation for an in-order machine. An in-order machine is a process that executes instructions sequentially, that is, in the programmer-specified order. Another way for injecting handlers may be used for out-of-order machines. In an "out-of-order" machine, the instructions are not executed sequentially. An "out-of-order" machine is also known as a dynamically scheduled machine. The instructions to be executed are put into a pool and the processor executes them without regard to the programmer-specified order. For an out-of-order machine, the instructions for the lightweight handler may be inserted into the pool without stalling or blocking the processor pipeline. Another way for injecting handlers may be used for machines that are between "in-order" and "out-of-order". These types of machines are known as decoupled. It keeps a queue of instructions that have already been fetched and are waiting to execute. The fetching of instructions operates asynchronously from the executing of instructions. In this type of machine, the instructions may be inserted into the queue or pool without stalling the pipeline.

Another embodiment of this invention includes a dynamic handler determiner 104. The dynamic handler determiner 104 tracks the occurrence of exceptions. The dynamic handler determiner 104 inserts lightweight handlers into the splice cache 101 based on some dynamic criteria. The dynamic criteria may be to insert lightweight handlers for the most frequently occurring exceptions into the splice cache 101. The dynamic criteria may be based on the most recently occurring exception. The dynamic handler determiner 104 could be implemented by hardware or software. The dynamic handler determiner 104 allows a system to maximize the use of its splice cache 101 so that the most frequently occurring non-fatal exceptions are handled by the plurality of lightweight handlers 102 in the splice cache 101. This permits a processor to achieve a high level of performance for various uses. The dynamic handler determiner may insert handlers or have the instrumentation mechanism insert the handlers.

The lightweight handlers 102 may also be determined by a user. The user can determine which exceptions she would like handled by the lightweight handlers 102. This allows the users to determine how to balance the resources according to their needs.

The lightweight handlers 102 may also be determined by an application. One application could encounter a large number of floating point exceptions and determine that a lightweight handler for it should be placed in the splice cache 101. Another application may rarely encounter a floating point exception so it would not place a lightweight handler for it in the splice cache 101. Applications may be controlled by a user.

In another embodiment, a pipeline 105 is coupled to the splice cache 101. The pipeline 105 has earlier stages that must be blocked so that the lightweight handler 102 can be inserted without flushing the pipeline.

In another embodiment, a pipeline 105 is coupled to the splice cache 101 and the pipeline 105 has a pool so that a lightweight handler may be added to the pool without flushing the pipeline 105. The pool is an instruction pool used in "out-of-order" machines and other types of machines.

Figure 2:
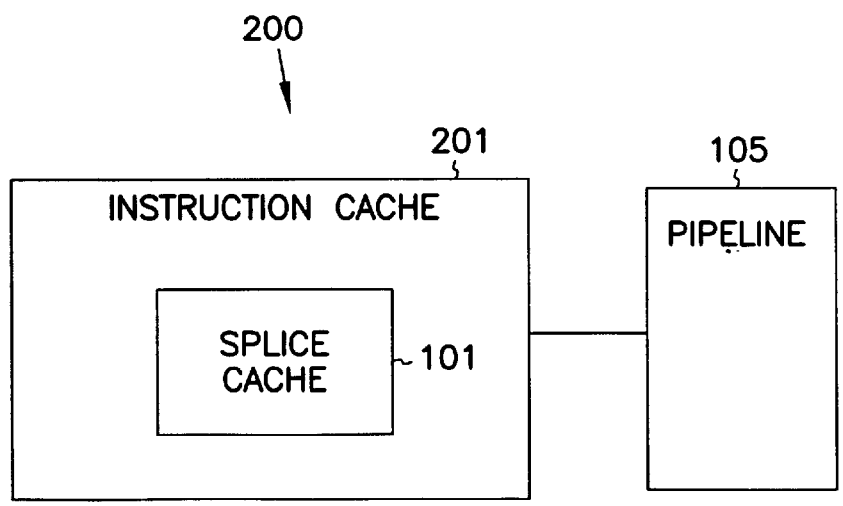
FIG. 2 shows a diagram of an instruction cache according to an embodiment of the invention.

In another embodiment, the splice cache 101 is a separate cache. In another, as shown in FIG. 2, the splice cache 101 is located within an instruction cache 201. The instruction cache 201 is used to cache instructions to be executed by a processor. An extra bit could be tacked on to splice cache instructions to signal exception processing. The system can be implemented either way to make the best use of available resources.

Figure 3:
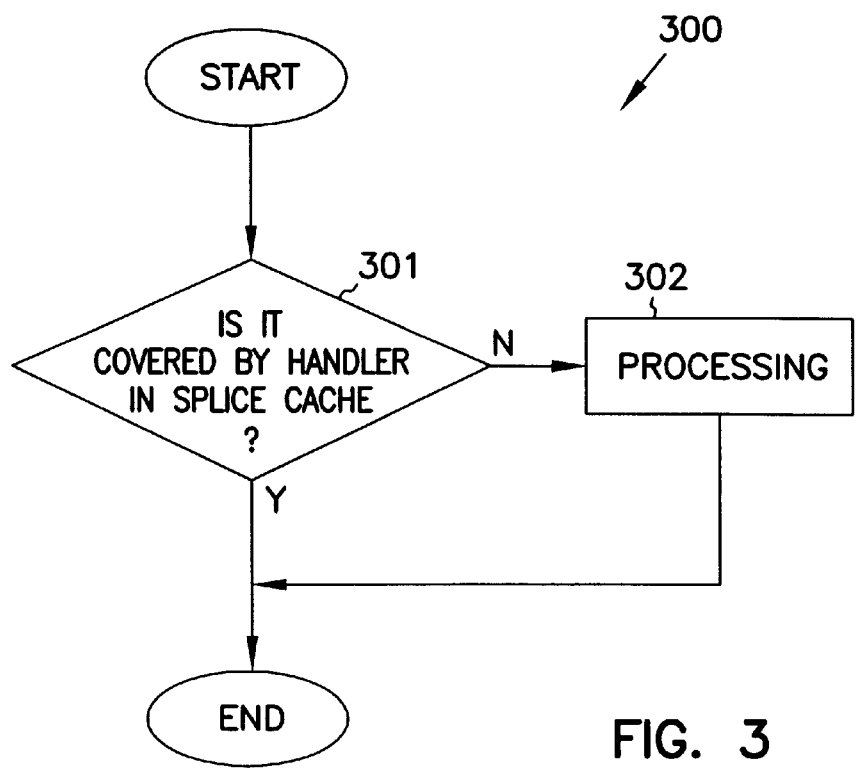
FIG. 3 shows a flowchart of a method according to an embodiment of the invention; and, FIG. 4 shows a diagram of splice cache system according to an embodiment of the invention.

Referring to FIG. 3, a method according to an embodiment of the invention is described. A determination may be made whether the exception is fatal or nonfatal. A fatal exception is one that will cause a current program to halt. A non-fatal exception will not cause a program to halt. A check is done to see if the exception is covered by any of the lightweight handlers in a splice cache 301. If it is not, typically, a call to the operating system is made to handle the exception and the pipeline is flushed. If the exception is covered by a lightweight handler in the splice cache, the appropriate lightweight handler will process the exception 302.

In another embodiment, the occurrence of exceptions are tracked. When the occurrence of a exception exceeds a predetermined amount, a lightweight handler for it may be added to the splice cache. Then, a less frequently or less recently used lightweight handler would be removed from the splice cache. This embodiment allows the dynamic alteration of the contents of the splice cache so as to allow the best use of the splice cache.

In other embodiments, a user, an application, or a processor may determine which lightweight handlers occupy the splice cache.

Figure 4:
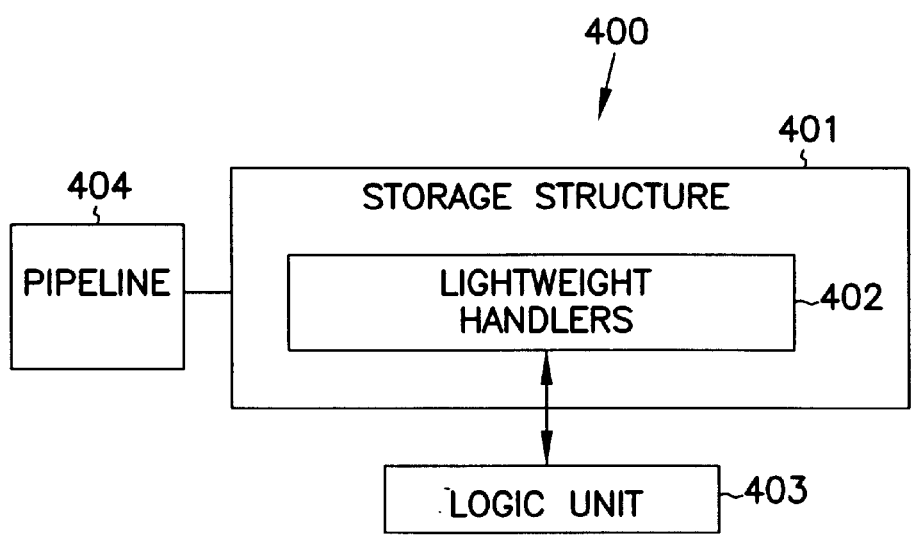

Referring to FIG. 4, a splice cache system according to an embodiment of the invention is disclosed. The splice cache system includes a storage structure 401, one or more lightweight handlers 402, and a logic unit 403. The storage structure 401 can be made out of any type of memory or storage medium. For example, the storage structure could be an allocation of virtual memory or space on a hard drive. The storage structure 401 may exist in its own space or it may exist as part of a larger memory.

The lightweight handlers 402 are located withing the memory space 401. Each lightweight handler is capable of handling an exception. This allows the exception to be handled while avoiding a full pipeline flush.

The logic unit 403 is coupled to the storage structure. It may be capable of adding and removing lightweight handlers to the storage structure 401. This allows the lightweight handlers used to vary. The logic 403 may be controlled by a user, an application, or a processor. Thus, the plurality of lightweight handlers 402 can vary according to the use or application. The logic unit 403 may also track the occurrence of exceptions and add and remove lightweight handlers according to standard replacement algorithms.

In another embodiment, a pipeline 404 is coupled to the storage structure 401. The pipeline 404 has a number of stages. The number of stages may vary. A number of stages are blocked or stalled to allow the lightweight handler to enter the pipeline 404. The pipeline 404 may also have a pool and the lightweight handler is then added to the pool instead of blocking stages.

Figure 5:
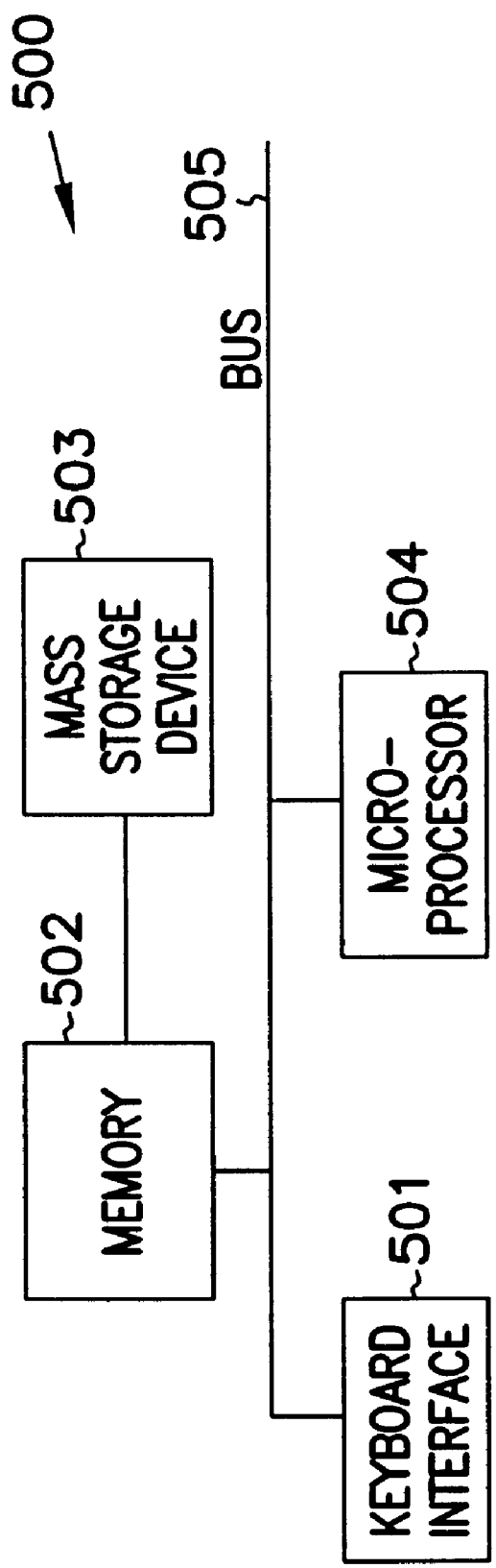
FIG. 5 shows a diagram of a computer in conjunction with which an embodiment of the invention may be practiced.

FIG. 5 is a block diagram of a computer system 500 of an example embodiment of the present invention. The computer system 500 comprises bus 505, keyboard interface 501, external memory 502, mass storage device 503 and processor 504. Bus 505 can be a single bus or a combination of multiple buses. Bus 505 provides communication links between components in the computer system. Keyboard interface 501 can be a dedicated device or can reside in another device such as a bus controller or other controller. Keyboard interface 501 allows coupling of a keyboard to the computer system and transmits signals from a keyboard to the computer system. External memory 502 can comprise a dynamic random access memory (DRAM) device, a static random access memory (SRAM) device, or other memory devices. External memory 502 stores information from mass storage device 503 and processor 504 for use by processor 504. Mass storage device 503 can be a hard disk drive, a floppy disk drive, a CD-ROM device, or a flash memory device. Mass storage device 503 provides information to external memory 502.

Processor 504 includes a single register file containing both speculative values and architecturally visible values. The processor 504 may be compatible with, but is not limited to, processors such as an Intel® architecture processor, manufactured by Intel Corporation of Santa Clara, Calif., the assignee of the present invention. In alternate embodiments, the processor 504 is compatible with a PowerPC™ architecture processor, an Alpha™ architecture processor, and the like. It is appreciated that at least some embodiments of the processor of the present invention are pipelined.

The various embodiments may be used or implemented on the computer system described. Other computer systems may also be used.

The various embodiments described above allow exceptions to be handled in a flexible and fast manner, unlike the prior art. Unlike exception handlers that were hardwired, the exception handling in this invention may be modified while providing the same performance. Unlike exception handling that was previously done by operating systems and software, the exception handling in this invention does not require flushing the pipeline causing a degradation in performance. This allows the instruction stream to continue uninterrupted which will yield higher performance.

Fast exception processing has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefor, it is manifestly intended that this invention be limited only by the following claims and equivalents thereof.

I claim:

1. A method of operating a data processor, comprising:
   executing instructions of an application program at least partly from a writable cache loaded from a memory;
   loading some of a plurality of exception handlers to the writable cache according to a dynamic criterion that is independent of a criterion for loading the application program instructions;
   receiving an indication of an exception;
   executing one exception handler associated with the exception from the writable cache if the associated exception handler is loaded in the cache.

2. The method of claim 1 further comprising calling an operating system to execute the associated exception handler if it is not loaded in the writable cache.

3. The method of claim 1 where the exception handlers are loaded into an instruction cache for the application program.

4. The method of claim 3 where instructions of the exception handler carry an identifying designation in the writable cache.

5. The method of claim 1 where the exception handlers are loaded separately from an instruction cache for the application program.

6. The method of claim 1 where the criterion is selected by a user.

7. The method of claim 1 where the criterion is selected by the application program.

8. The method of claim 1 further comprising tracking the occurrence of exceptions, and where the criterion is to load handlers associated with the most frequently occurring exceptions.

9. The method of claim 1 where the application program instructions and the one exception handler are both executed from the same pipeline of the processor.

10. The method of claim 9 where the exception handler is executed without flushing the application programs from the pipeline.

11. A computer system comprising:
    a processor to execute an application program and a plurality of exception handlers associated with a plurality of different exception signals;
    a writable cache to store both portions of the application program and some but not all of the exception handlers simultaneously;
    a determiner to load certain of the handlers into the writable cache according to a dynamic criterion that is independent of a criterion to load the application program portions in the writable cache;
    an instrumentation mechanism responsive to the exception signals to execute the associated exception handlers directly from the writable cache, when the associated handlers are in the writable cache.

12. The system of claim 11 where the writable cache is an instruction cache to store both the instruction application program portions and the certain handlers.

13. The system of claim 12 where the certain handlers carry indicia differentiating them in the instruction cache from the application program portions.

14. The system of claim 11 where the certain handlers and the application program portions are separate from each other in the writable cache.

15. The system of claim 11 where the criterion is selected by a user.

16. The system of claim 11 where the criterion is selected by the application program.

17. The system of claim 11 further comprising a logic unit to track exception, and where the criterion is to load handlers associated with the most frequently occurring exceptions.

18. The system of claim 11 where the processor has a pipeline to contain both portions of the application and the certain handlers, and where the instrumentation mechanism loads the associated handlers from the writable cache directly into the pipeline without flushing the pipeline.

19. A method of operating a data processor, comprising:
    loading instructions of an application program from a writable cache to a pipeline of the processor according to a first criterion;
    loading instructions of some of a plurality of exception handlers according to a dynamic criterion to the writable cache according to a second criterion that is independent of the first criterion;
    receiving an indication of one of a plurality of exceptions;
    determining whether one of the handlers associated with the one exception is loaded in the cache;
    if so, loading at least one instruction of the associated handler from the writable cache directly to the same pipeline without flushing the application program instructions from the pipeline.

20. The method of claim 19 further comprising stalling the pipeline while loading the at least one handler instruction into the pipeline.

21. The method of claim 20 where all the application program instructions in the pipeline at the time of receiving the exception signal remain in the pipeline when the at least one handler instruction is loaded thereinto.

22. A computer system comprising:
    a processor to produce a plurality of different exception signals;
    a writable cache to store instructions of an application program loaded according to a first criterion;
    a plurality of exception handlers associated with respective ones of the exception signals;
    a determiner to load certain of the handlers into the writable cache according to a dynamic criterion that is independent of the first criterion;
    a pipeline having multiple stages to execute both the application program instructions and the exception handlers;
    an instrumentation mechanism responsive to the exception signals to load the associated handlers from the writable cache directly into the pipeline without flushing the pipeline, when the associated handlers are loaded in the writable cache.

23. The system of claim 22 further comprising exception logic to determine when the associated handlers are loaded in the writable cache.

24. The system of claim 22 where the instrumentation logic includes selection logic to select either a previous stage in the pipeline or the writable cache.

25. The system of claim 22 where the instrumentation mechanism stalls the pipeline in response to the exception signals.

26. The system of claim 22 where the pipeline is a pool.

27. The system of claim 22 where the pipeline is a queue.

28. A computer system comprising:
    at least one interface;
    at least one memory;
    a processor to execute an application program and a plurality of exception handlers associated with a plurality of different exception signals;
    a writable cache to store both portions of the application program and some but not all of the exception handlers simultaneously;
    a determiner to exchange certain of the handlers into the writable cache according to a dynamic criterion that is independent of the application program portions in the writable cache;
    a pipeline having multiple stages to execute both instructions of the application program and the exception handlers;
    an instrumentation mechanism responsive to the exception signals to load the associated handlers from the writable cache directly into the pipeline without flushing the pipeline, when the associated handlers are loaded in the writable cache;
    a bus coupling the interface, the memory, and the processor.

29. The system of claim 28 where the user determines the dynamic criterion to load the exception handlers into the writable cache.

30. The system of claim 28 where the instrumentation mechanism stalls the pipeline in response to the exception signals.

31. The system of claim 28 where the interface is operable by a user of the system to specify the criterion.

32. The system of claim 28 where the memory holds the application program and the exception handlers.

33. The system of claim 28 where the memory includes a mass storage device.

* * * * *

UNITED STATES PATENT AND TRADEMARK OFFICE
CERTIFICATE OF CORRECTION

PATENT NO.   : 6,625,693 B2
DATED        : September 23, 2003
INVENTOR(S)  : Harshvardhan Sharangpani, Ken Arora and Gary Hammond It is certified that error appears in the above-identified patent and that said Letters Patent is hereby corrected as shown below:

<u>Title page, Item [54] and Column 1, line 1,</u>
Insert -- WITH MULTIPLE CACHED HANDLERS -- after "PROCESSING".

Signed and Sealed this

Ninth Day of March, 2004

JON W. DUDAS
*Acting Director of the United States Patent and Trademark Office*